United States Patent
Locatelli

(10) Patent No.: US 7,089,157 B2
(45) Date of Patent: Aug. 8, 2006

(54) MEASURING DEVICE, INCLUDING AT LEAST A SENSOR, CAPABLE OF OPERATING IN DIFFICULT CONDITIONS

(75) Inventor: Marcel Locatelli, Montbonnot (FR)

(73) Assignees: Commissariat a l'Energie Atomique, Paris (FR); Labinal, Saint Ouen ( * ) Notice: Subject to any disclaimer, the term of this patent is extended or adjusted under 35 U.S.C. 154(b) by 0 days.

(21) Appl. No.: 10/492,779

(22) PCT Filed: Oct. 17, 2002

(86) PCT No.: PCT/FR02/03558

§ 371 (c)(1),
(2), (4) Date: Apr. 15, 2004

(87) PCT Pub. No.: WO03/033283

PCT Pub. Date: Apr. 24, 2003

(65) Prior Publication Data

US 2004/0243322 A1 Dec. 2, 2004

(30) Foreign Application Priority Data

Oct. 19, 2001 (FR) .................................. 01 13509

(51) Int. Cl.
*H04G 5/22* (2006.01)

(52) U.S. Cl. ................ 702/188; 340/10.33; 340/10.34; 340/10.5; 340/572.1; 702/122

(58) Field of Classification Search ................ 702/188; 455/7, 9, 13, 15, 19, 63, 69, 343, 49; 340/10.33, 340/10.34, 10.5, 572.1, 573.1, 537.4
See application file for complete search history.

(56) References Cited

U.S. PATENT DOCUMENTS

| | | | |
|---|---|---|---|
| 5,553,138 A * | 9/1996 | Heald et al. ................. | 379/413 |
| 5,896,569 A * | 4/1999 | Butler et al. ................. | 455/423 |
| 6,259,726 B1 * | 7/2001 | Saadeh et al. .............. | 375/222 |
| 6,378,360 B1 | 4/2002 | Bartels | |
| 6,473,055 B1 * | 10/2002 | Kohno et al. ................ | 343/853 |
| 6,507,610 B1 * | 1/2003 | Saadeh et al. .............. | 375/222 |
| 6,525,648 B1 * | 2/2003 | Kubler et al. ............ | 340/10.33 |
| 6,674,368 B1 * | 1/2004 | Hawkins et al. ......... | 340/573.4 |
| 6,711,382 B1 * | 3/2004 | Chiba et al. ............... | 455/63.4 |
| 6,816,063 B1 * | 11/2004 | Kubler et al. ............ | 340/10.33 |

(Continued)

FOREIGN PATENT DOCUMENTS

DE 197 02 768 4/1998

(Continued)

*Primary Examiner*—Carol S. W. Tsai
(74) *Attorney, Agent, or Firm*—Thelen Reid & Priest LLP

(57) ABSTRACT

This invention relates to a measurement device comprising at least one sensor (20) designed to be installed on a mobile element (8) free to move with respect to a base (14), the mobile element being capable of moving into several positions with respect to the base (14) including a so-called proximity position in which it is close to the base (14). The sensor (20) cooperates with a power supply device comprising a rechargeable energy source (22) equipped with at least one first charging antenna (23-1) located on the mobile element (8) and at least one second charging antenna (23-2) located on the base (14), to be coupled to the first charging antenna (23-1) to recharge the energy source (22). Coupling between the two charging antennas (23-1, 23-2) is only made when the mobile element (8) is in the proximity position.

21 Claims, 6 Drawing Sheets

U.S. PATENT DOCUMENTS

2001/0052875 A1* 12/2001 Kohno et al. ................ 342/417
2002/0006812 A1* 1/2002 Saadeh et al. .............. 455/557
2002/0017979 A1 2/2002 Krause et al.
2002/0024443 A1* 2/2002 Hawkins et al. ......... 340/573.1
2003/0141409 A1* 7/2003 Lisoski et al. ................ 244/13

FOREIGN PATENT DOCUMENTS

DE     197 36 181     2/1999
DE     100 00 756     7/2001
WO     91/00054     1/1991

* cited by examiner

US 7,089,157 B2

MEASURING DEVICE, INCLUDING AT LEAST A SENSOR, CAPABLE OF OPERATING IN DIFFICULT CONDITIONS

CROSS-REFERENCE TO RELATED APPLICATION

This application claims priority based on International Patent Application No. PCT/FR02/03558, entitled "Measuring Device, Including At Least One Sensor, Capable Of Operating Under Difficult Conditions" by LOCATELLI, Marcel, which claims priority of French application no. 01 13509, filed on Oct. 19, 2001, and which was not published in English.

TECHNICAL DOMAIN

This invention relates to the domain of measurement devices, including at least one sensor capable of operating under difficult conditions. Difficult conditions means that their sensor is designed to be installed on a mobile element that may be subjected to all sorts of movements and accelerations, in corrosive, humid environments, under a vacuum, at very high or very low temperature, with abrasive dust, etc. These measurement devices comprise one or several sensors for measuring physical or chemical magnitudes that are essential information acquisition elements. These sensors may be of any type. They may evaluate any type of physical or chemical magnitudes, for example pressure, temperature, position, velocity, acceleration, humidity, gas concentration, shape, etc. They convert this physical or chemical magnitude into an electrical magnitude.

STATE OF PRIOR ART

The measurement device comprises at least one sensor on a mobile element free to move with respect to a base, and the sensor must be supplied with energy in order to be able to operate. Very frequently, the energy power supply device fitted in the measurement device to power the sensor is not entirely located on the mobile element. This may be because it is not possible due to conditions, for example the temperature or humidity is too high, the atmosphere is too corrosive, etc. In some applications, maintenance is difficult and it may be necessary to interrupt a process to replace the power supply device on the mobile element and this is unacceptable. In other applications, there is simply not enough available space.

It has been proposed to provide a remote power supply for the sensor. The measurement device then comprises a first charging antenna connected to the sensor and a second charging antenna, the first charging antenna receiving energy from the second charging antenna remote from the first antenna. The second charging antenna is designed to be connected to a main energy source located on the base. But the second charging antenna is not located on the base. The frequencies and the powers necessary for the remote power supply are such that the first charging antenna and the second charging antenna cannot be more than a few tens of centimetres away to comply with electromagnetic compatibility standards.

Therefore the second charging antenna is connected to the main energy source through a cable. However, a few tens of centimetres from the sensor, the cable is still highly stressed due to the difficult environment, and it must be carefully maintained. It may be necessary to replace the cable frequently, which is not always easy due to poor access. This type of maintenance is expensive.

The measurement device also comprises an electronic processing circuit associated with the sensor that processes information originating from the sensor to make it interpretable. It is located close to the sensor on the mobile element. The sensor communicates with a user device through the electronic processing circuit.

The user device itself is fixed to the base and communication usually takes place by remote transmission. This remote transmission is achieved by providing the measurement device with two communication antennas, a first located on the mobile element close to the sensor, and a second generally located close to the second charging antenna and connected to the user device by a wire link.

Refer to FIGS. 1A, 1B and 1C that diagrammatically show an example of a known type of measurement device for monitoring the pressure in the tires 2 of an aircraft 1, particularly during the landing and takeoff phases. This measurement device comprises at least one pressure sensor 3 fixed to a wheel 8 of the aircraft 1 and more precisely its tire 2. During the taxiing phase on the ground, the tire 2 is free to move with respect to the fuselage 6, the wings 15 and with respect to the landing gear 11 of the aircraft 1. The pressure sensor 3 is associated with an electronic processing circuit 4 also located on the wheel 8 at the tire 2.

The pressure sensor 3 and its electronic processing circuit 4 must be powered with energy. A rechargeable energy source 12 cooperates with the pressure sensor 3 and with its electronic processing circuit 4, located in their neighbourhood on the wheel 8 at the tire 2 or close to it. It is connected to a first charging antenna 13-1 located on the wheel 8 at or close to the tire 2. The first charging antenna 13-1 will receive energy from a second charging antenna 13-2 fixed to the hub 9 of the wheel 8 of the aircraft 1. The second charging antenna 13-2 is connected by a cable 10 to a main energy source 16 located in the fuselage 6 or the wing 15 of the aircraft 1. This main energy source may be one of the generators of the aircraft.

The pressure sensor 3 is designed to communicate with a user device 5 located at the fuselage 6 or at the wing 15 of the aircraft 1. This communication takes place by remote transmission. A first communication antenna 7-1 connected to the electronic circuit 4 and fixed on the wheel 8 at or close to the tire 2, communicates with a second communication antenna 7-2 fixed to the hub 9 of the wheel 8 of the aircraft 1 and connected by a cable 10 to the user device 5. The cable 10 runs along the landing gear 11 of the aircraft 1.

For simplification purposes, a single cable 10 has been shown to connect firstly the second communication antenna 7-2 to the user device 5, and secondly the second charging antenna 13-2 to the main energy source 16. In another configuration, the charging and communication functions are performed by a single antenna, part of which is fixed to the wheel and the other part is fixed to the hub.

The cables that run along the landing gear 11 of the aircraft are highly stressed particularly due to the extreme temperatures to which they may be subjected (for example between −40° C. in the landing gear hold 14 during flight and +200° C. at the hub 9 during landing), and movements applied to them during extraction or retraction of the landing gear, rotation of the wheels. They have to be replaced regularly, which introduces high costs of labour and supply.

This configuration also introduces constraints in the choice of powers and frequencies to be transmitted to prevent disturbances when the antennas communicate with each other at the same time, since they are all very close to each other.

PRESENTATION OF THE INVENTION

This invention is designed to overcome the above-mentioned disadvantages and to propose a measurement device including at least one sensor fixed to a mobile element free to move with respect to a base, this measurement device being capable of operating under difficult conditions without very thorough maintenance.

To achieve this, this invention proposes to delete cable connections leading to the base and located in very exposed locations, in a measurement device including at least one sensor fixed to a mobile element free to move with respect to the base.

More precisely, the measurement device according to the invention comprises at least one sensor designed to be installed on a mobile element free to move with respect to a base, the mobile element being capable of moving into several positions with respect to the base including a so-called proximity position in which it is close to the base. The measurement device also comprises a power supply device that cooperates with the sensor, this power supply device being provided with a rechargeable energy source located on the mobile element, equipped with at least one first charging antenna and at least one second charging antenna to being coupled to the first charging antenna for recharging. The second charging antenna is located on the base and coupling between the two charging antennas only takes place when the mobile element is in the proximity position.

The measurement device sensor will communicate by remote transmission with a user device, and communication is possible in one or several positions of the mobile element other than the proximity position.

The communication may be two-directional, namely in transmission and in reception.

In order to enable this remote transmission, the measurement device may comprise at least one first communication antenna located on the mobile element and connected to the sensor, and at least one second communication antenna that will be coupled to the first communication antenna located on the base and to be connected to the user device.

At least one of the communication antennas and one of the charging antennas may be coincident. When the pair of communication antennas is also used for charging, these two antennas then perform the two functions of providing information and recharging energy into the sensor.

The measurement device may comprise an electronic processing circuit located close to the sensor on the mobile element, the communication between the sensor and the user device being made through the electronic processing circuit. It would also be possible for the communication to take place when the mobile element is in its proximity position with respect to the base.

It is preferable for the first charging antenna and the second charging antenna to be confined in a Faraday cage when the mobile element is in its proximity position with respect to the base.

The rechargeable energy source may include at least one accumulator element or at least one capacitor.

The measurement device according to the invention may need to cooperate with a removable auxiliary charger provided with an auxiliary charging antenna, and this charger needs to be close to the first charging antenna to couple it to the auxiliary charging antenna, when the mobile element is in a position other than its proximity position with respect to the base.

It is preferable if the auxiliary charger is equipped with a shielded box acting as a Faraday cage.

The mobile element may be located on a wheel of an aircraft and the fixed element may be located on landing gear on which this wheel is fitted, the landing gear being stowed in the hold when it is in the proximity position.

In another configuration, the mobile element is an arm and the base is a support for the arm, and the arm rests on the support in the proximity position.

The sensor located on the mobile element may follow a closed trajectory, the mobile element moving successively into several positions including at least one working position and the proximity position.

This invention also relates to a process for transferring measurements between at least one sensor supported by a mobile element and a user device in which the sensor is powered with energy by a rechargeable energy source. When in the proximity position between the mobile element and a base, the energy source is recharged by coupling between two charging antennas, one being located on the mobile element and the other on the base, and in another position, the sensor communicates by remote transmission with the user device through two communication antennas, one being located on the mobile element and the other being located on the base and being connected to the user device.

BRIEF DESCRIPTION OF THE DRAWINGS

This invention will be better understood after reading the description of example embodiments given purely for information and in no way limitative, with reference to the attached drawings on which.

DETAILED PRESENTATION OF PARTICULAR EMBODIMENTS

Figure 2A:
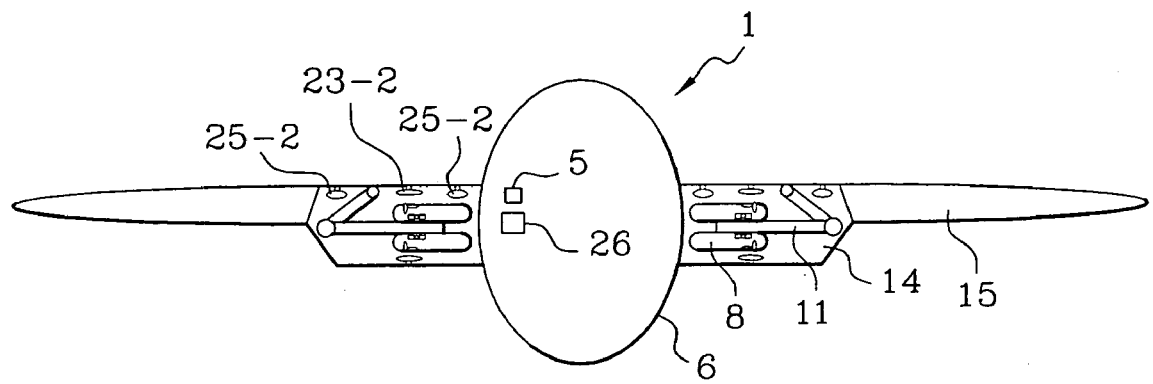
FIGS. 2A and 2B show an aircraft with the landing gear stowed, equipped with a measurement device according to the invention.
Figure 2B:
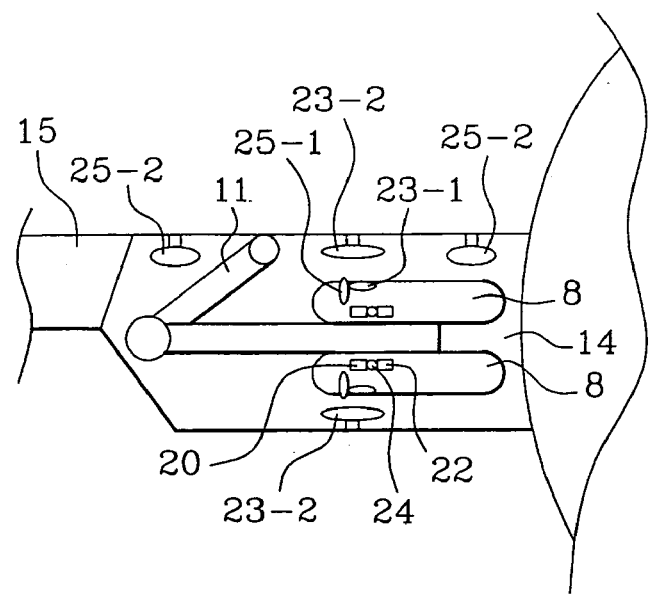
Figure 3A:
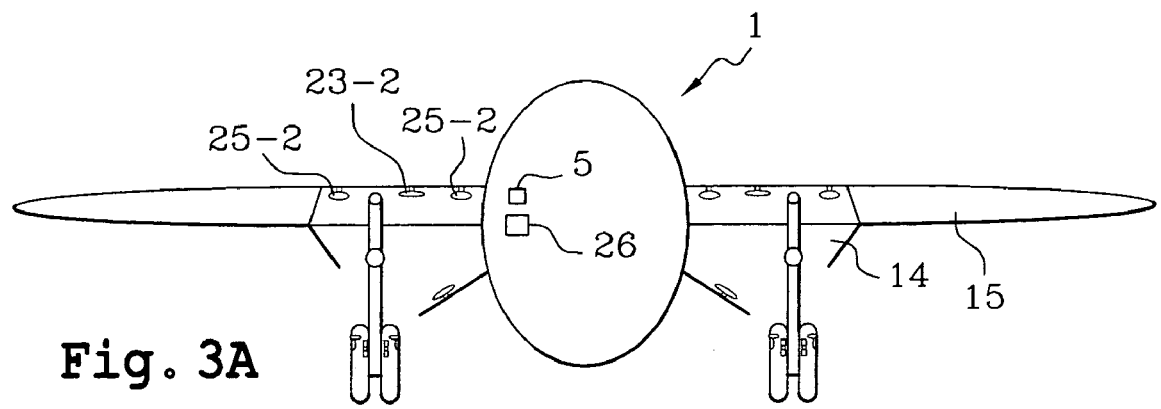
FIGS. 3A, 3B show the same aircraft with the landing gear extended.
Figure 3B:
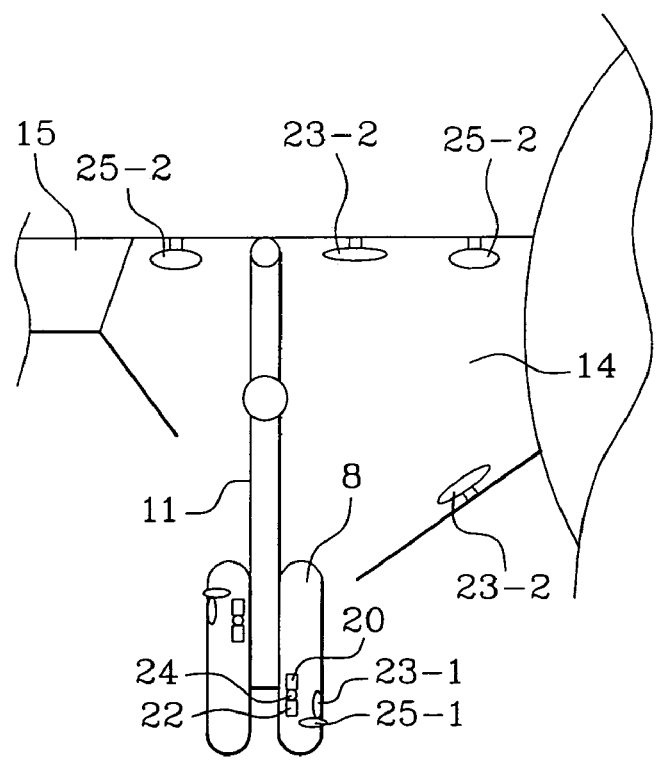

We will now describe a measurement device conform with the invention. Refer to FIGS. 2A, 2B and 3A, 3B. In the example described, the measurement device according to the invention is applicable to the avionics domain. FIG. 2A shows an aircraft in flight with its landing gear stowed in a hold 14 and FIG. 2B shows a zoom of the stowed landing gear. FIG. 3A shows an aircraft on the ground and FIG. 3B shows a zoom of the landing gear when extended.

Figure 1A:
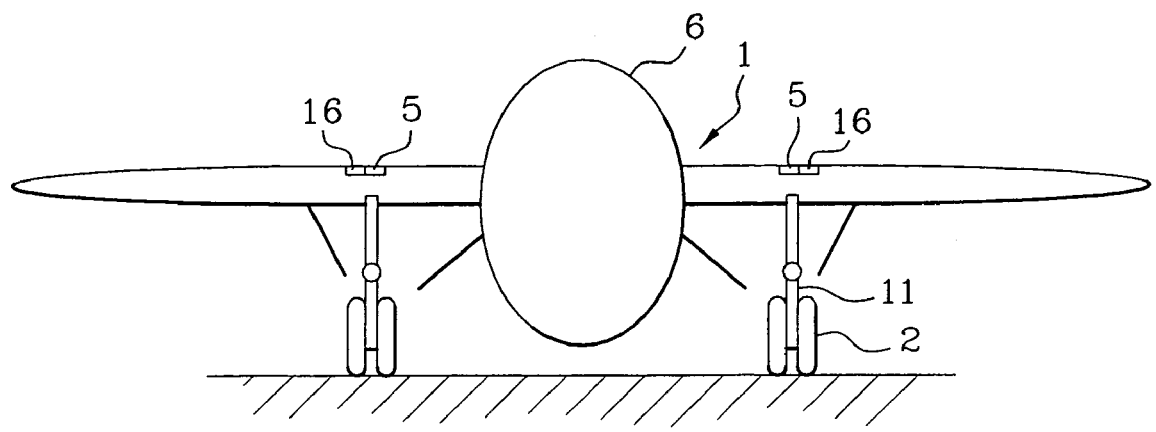
FIGS. 1A, 1B and 1C (already described) show an aircraft for which the landing gear is fitted with a known type of measurement device, a side view and an enlarged partial cross-sectional view of the landing gear.
Figure 1B:
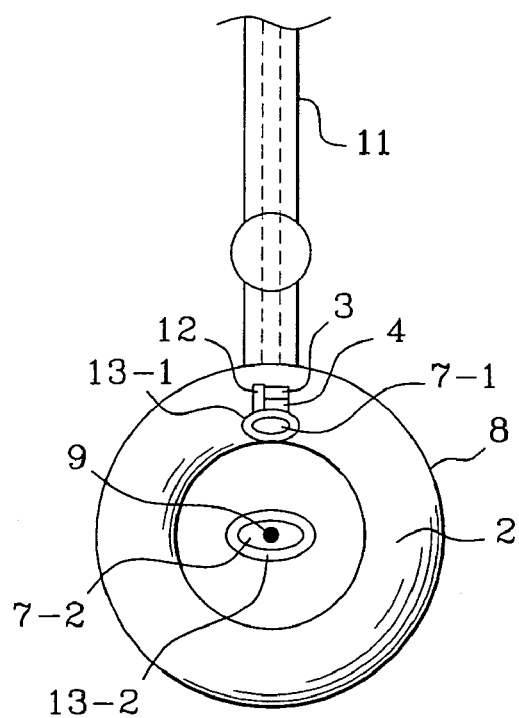
Figure 1C:
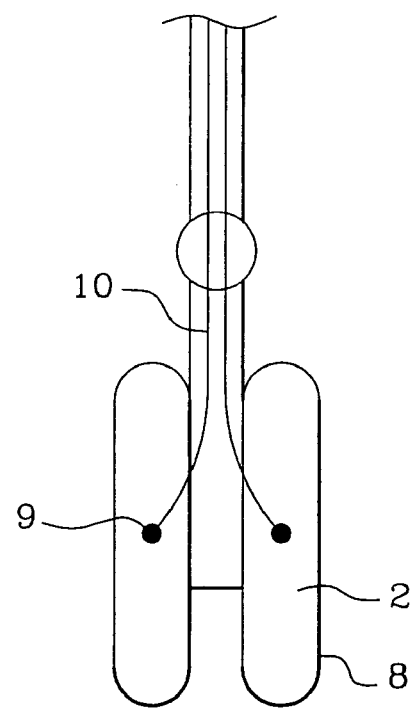

As shown in FIGS. 1, the aircraft is marked as reference 1, the aircraft wheels reference 8, the aircraft fuselage reference 6, the landing gear reference 11, the wings reference 15, and the landing gear hold reference 14. The wheel 8 conventionally consists of a rim surrounded by a tire, but the tires are not referenced.

The measurement device according to the invention comprises at least one sensor 20, in this case for example a pressure sensor that will be mounted on a mobile element free to move with respect to the base; in the example the mobile element 8 is the wheel of the aircraft 1 and the base is the hold 14 of the aircraft 1 containing the landing gear 11. This hold may be located in a wing 15 or in the fuselage 6, depending on the position at which the landing gear is fixed.

Instead of being a pressure sensor, the sensor may for example be a temperature sensor.

The sensor 20 is located on the tire of the wheel 8. In FIGS. 2A and 3A, all elements carried by the wheels are shown diagrammatically by a circle to avoid confusing the FIGURES. They are shown in detail in FIGS. 2*b*, 3B.

The measurement device also comprises a power supply device for the sensor 20. This power supply device comprises a rechargeable energy source 22 provided with at least one first charging antenna 23-1, the rechargeable energy source 22 and the first charging antenna 23-1 generally being fixed to the wheel 8, but they can be located at the tire or at the rim so that they are close to the sensor 20.

The power supply device also comprises at least one second charging antenna 23-2 located on the base 14 that must be coupled to the first charging antenna 23-1 to recharge the rechargeable energy source 22. The second charging antenna 23-2 radiates energy from a main energy source 26 for example located in the fuselage 6 and which may be one of the aircraft generators.

The wheel 8 can be in several positions with respect to the base 14. In particular, these positions depend on the position of the landing gear 11 that may move from a position stowed in the hold 14 to an extended position, taking up several intermediate positions.

One of these positions is called the proximity position, in which the mobile element 8 is close to the base 14. This proximity position corresponds to the situation in which the landing gear 11 is stowed in the hold 14 of the aircraft 1. In this position, the aircraft is in flight.

According to the invention, coupling between the first charging antenna 23-1 and the second charging antenna 23-2 takes place only when the mobile element 8 is in the proximity position.

In this position, the hold 14 that is closed acts as a Faraday cage in which the first charging antenna 23-1 and the second charging antenna 23-2 are confined. The radiation from the antennas remains confined in the hold 14 and does not escape into the atmosphere. Electromagnetic compatibility standards specific to aviation are then respected.

The rechargeable energy source 22 may consist of at least one capacitor for which the capacitance will be adapted to the required endurance of the sensor. This endurance may be several hours in the application for monitoring the tire pressure of an aircraft.

It would be possible for the rechargeable energy source to be made from accumulator elements provided that they are capable of operating at high temperatures, for example of the order of 175° C., and even resisting temperatures of the order of 210° C. without risk of explosion.

The sensor 20 is designed to communicate with a user device 5 for example located in the fuselage 6 or in the structure of the wing 15 of the aircraft 1. This communication takes place by remote transmission. The user device may for example trigger an alarm when the pressure is too low. This remote transmission may take place when the mobile element 8 is located in a position other than the proximity position.

The measurement device also comprises an electronic processing circuit 24 that processes information originating from the sensor 20 and makes it interpretable. Communication between the sensor 20 and the user device 5 passes through the electronic processing circuit 24. The electronic processing circuit 24 is located close to the sensor 20 on the mobile element 8.

The measurement device comprises at least one first communication antenna 25-1 located on the mobile element 8 and at least one second communication antenna 25-2 located on the base 14, to make remote transmission possible. The first communication antenna 25-1 is connected to the sensor 20 through the electronic processing circuit 24. The second communication antenna 25-2 should be connected to the user device 5. The first communication antenna 25-1 is located close to the sensor 20, like the first charging antenna, and it may be located on a tire or on the rim.

The power of the energy involved for the communication is much lower than the power necessary for recharging. The frequencies used are adapted so that they comply with electromagnetic compatibility standards and the transmission can take place when the landing gear is extended, in other words when it is necessary to check the tire pressure immediately before landing or takeoff.

The fact that the energy power supply and the communication are separated means that the choice of frequencies and powers for each function can be optimised. And this also increases possible ways of arranging the antennas.

Based on a transmission ratio of 0.1 during 10 minutes, which is typical during the landing phase and 0.0001 during 1 hour, which is typical for the phase prior to landing or takeoff, and for transmission at a frequency of 1 MHz and at a power of 1 mW at 10 V, the energy consumed is 0.6 Joules, which corresponds to a capacitance of 1 mF at 10 V.

Figure 4:
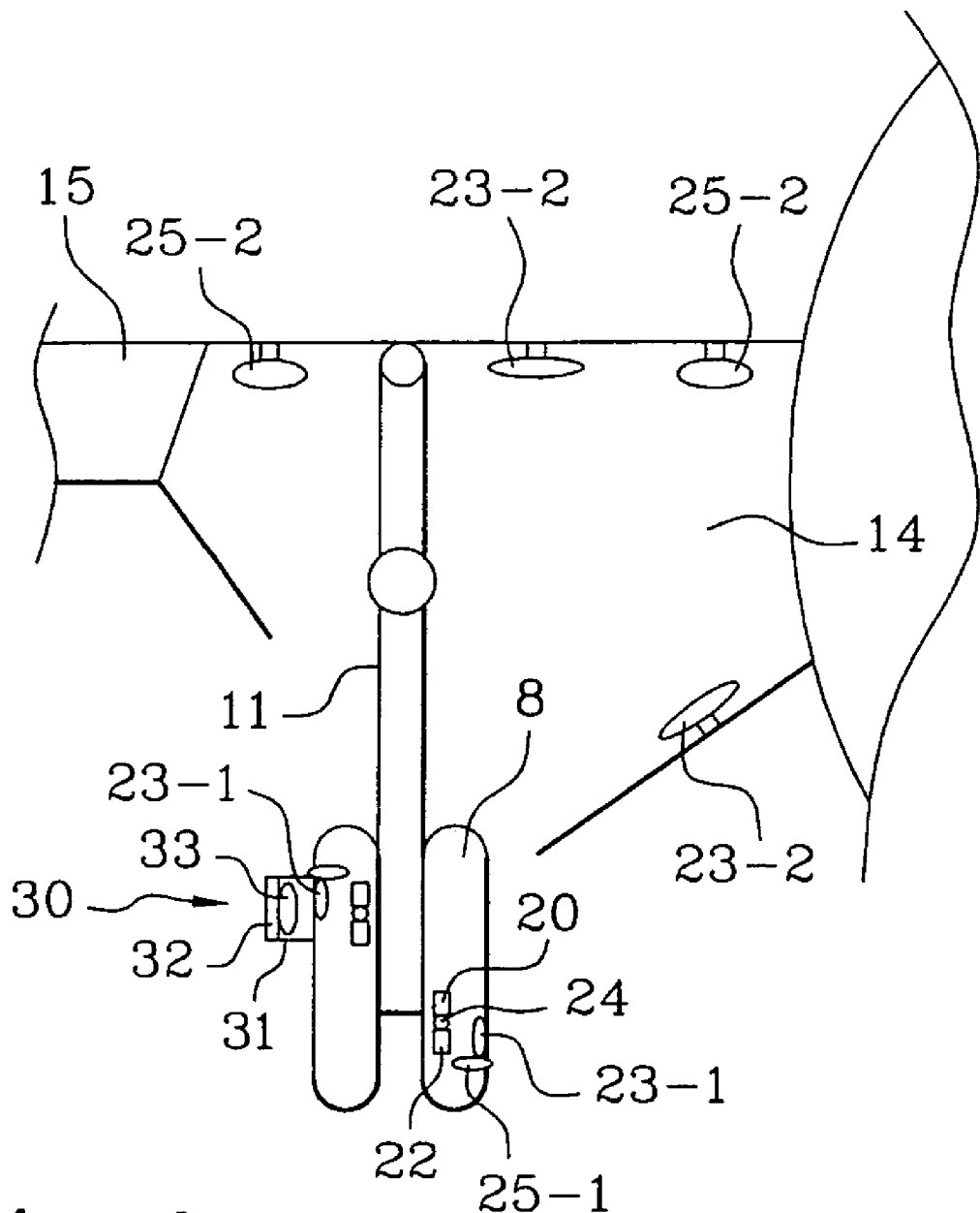
FIG. 4 shows the landing gear of the aircraft in FIG. 3B cooperating with a removable auxiliary charger.

In this application, it is also possible to use a removable auxiliary charger 30 to recharge the rechargeable energy source 22, when the mobile element 8 is not in the proximity position. Refer to FIG. 4 that shows this arrangement on a landing gear structure 11 conform with that shown in FIG. 3B.

When the aircraft is on the ground, for example during the maintenance phase, it may be necessary to check the tire pressure and the rechargeable energy source may not be sufficiently charged. The charger 30 comprises an auxiliary energy source 32 in a shielded box 31, connected to an auxiliary charging antenna 33. When the box 31 is brought adjacent to the wheel 8 of the aircraft concerned by recharging, coupling takes place between the auxiliary charging antenna 33 and the first charging antenna 23-1, at the first charging antenna 23-1 fitted on the wheel, and this coupling results in the rechargeable energy source 22 being recharged. The shielded box 31 acts as a Faraday cage and prevents any energy from leaking into the atmosphere.

Figure 5A:
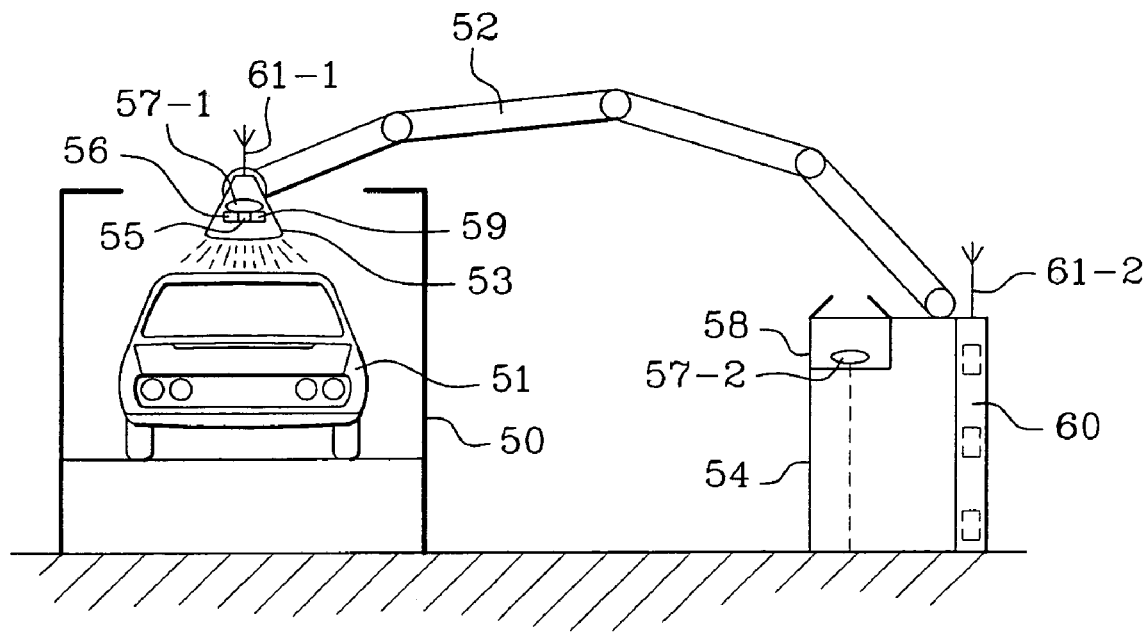
FIGS. 5A and 5B show a spray arm equipped with a measurement device according to the invention, in a working position and in a recharging position.
Figure 5B:
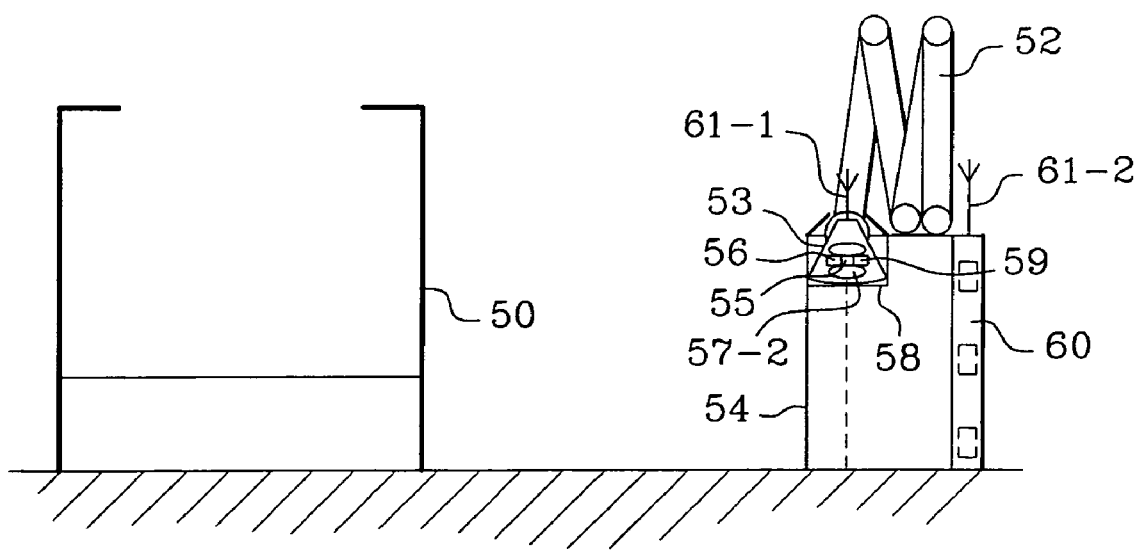

The measurement device conform with the invention may be used in application fields other than avionics. FIGS. 5A, 5B illustrate another application in the industrial domain. In this example, the measurement device is intended to evaluate climatic conditions in a booth 50 in which car bodies 51 are automatically painted using a spray arm 52.

In FIG. 5A, a car body 51 is placed in the booth 50 and the arm 52 is painting the body. The arm 52 terminates with a paint ejection nozzle 53. The arm 52 is articulated and its end opposite the nozzle 53 is fixed to a base 54. The arm 52 can be in many different positions with respect to the base 54, including a large number of working positions as shown in FIG. 5A and a rest position in which it is retracted onto the base 54 as shown in FIG. 5B. The paint booth 50 in FIG. 5B is empty.

The end of the arm 52 on which the nozzle 53 is fixed is fitted with one or several sensors 55 that will evaluate the atmosphere in the booth 50. For example, these sensors may be temperature sensors, humidity sensors or gas sensors. It is possible to determine whether or not climatic conditions in the booth are optimum before starting a painting operation, and whether or not the coat of paint is sufficiently dry before taking a freshly painted body out of the booth.

As in the previous example, the sensor 55 receives energy from a power supply device that includes a rechargeable energy source 56 fitted with at least one charging antenna 57-1, the rechargeable energy source 56 and the first charging antenna 57-1 being fixed to the arm 52. The rechargeable energy source may be made from accumulator or battery elements.

The power supply device also comprises a second charging antenna 57-2 located on the base 54, to be coupled to the first charging antenna 57-1 to recharge the rechargeable energy source 56. The second charging antenna 57-2 radiates energy from a main energy source which in this example is the mains power supply symbolised by the connection at the bottom of the base 54. The second charging antenna 57-2 is located at the bottom of a housing 58 of the base 54 in which the end of the arm 52 fitted with the nozzle 53 is positioned, when it moves into its rest position. This housing 58 acts as a Faraday cage.

In this position, the two charging antennas 57-1, 57-2 are close to each other. This rest position is the proximity position. According to the invention, the rechargeable energy source 56 is only recharged when the arm 52 takes this position. Radiation from the charging antennas 57-1, 57-2 remains confined in the housing 58, and is unable to escape into the atmosphere.

The sensor 55 will communicate with a user device 60 located on the base 54. This communication is made by remote transmission. For example, the user device 60 may control ejection of paint and movement of the arm. In this example, remote transmission takes place when the arm 52 is located in a position other than the proximity position, when the end of the arm 52 supporting the nozzle 53 plunges in the booth 50. An electronic processing circuit 59 processes information originating from the sensor 55 and makes it interpretable. The communication between the sensor 55 and the user device 58 transits through the electronic processing circuit 59. The electronic processing circuit 59 is located close to the sensor 20 at the end of the arm 52 carrying the nozzle 53. The remote transmission takes place between a first communication antenna 60-1 located on the arm 52 and a second communication antenna 60-2 located on the base 64. The first communication antenna 60-1 is connected to the sensor 55 through the electronic processing circuit 59. The second communication antenna 60-2 is connected to the user device 58.

Once again in this case the required power levels and frequencies are such that the transmission between the two communication antennas 60-1, 60-2 may take place in the atmosphere without infringing electromagnetic compatibility standards.

Figure 6:
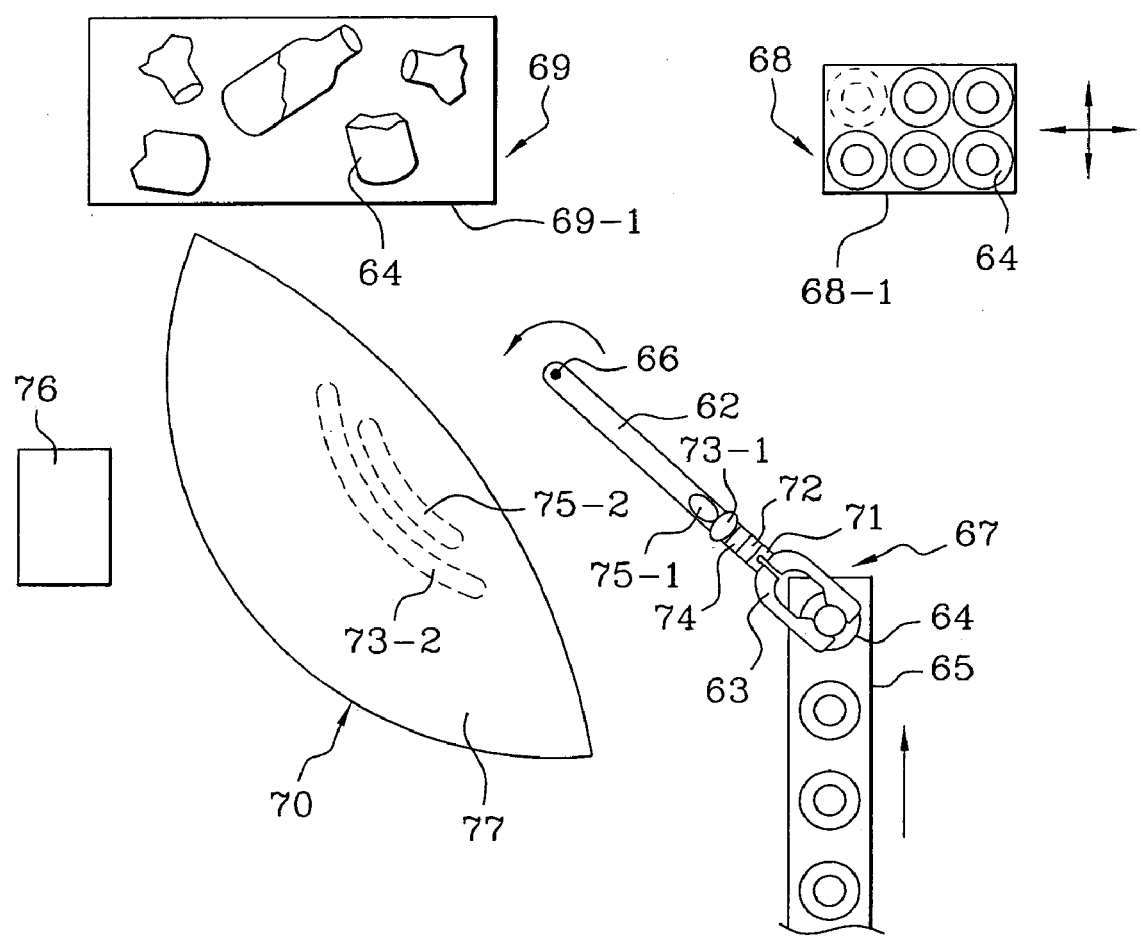
FIG. 6 shows a manipulator arm equipped with a measurement device according to the invention

We will now describe another example of a measurement device according to the invention. This example is chosen in the industrial field and more precisely in the field of checking and sorting of parts at the end of manufacturing. Refer to FIG. 6.

This figure shows a manipulator arm 62 terminating with a clamp 63 that will grip each part to be checked 64 in turn when they reach the end of a transport line 65. They are examined and sorted as a function of the result of the examination. In the example described, the parts 64 to be checked are flasks.

The other end of the arm 62 is fixed to a pivot 66, such that the arm can be driven in rotation around the pivot 66. During such a movement, the clamp 63 moves successively to a gripping area 67 to pick up flasks located at the end of the transport line 65, a packaging area 68 for flasks recognised as being conform, a storage area 69 for flasks recognised as being defective, and a recharging area 70. The arm 62 is free to move with respect to these different areas 67, 68, 69, 70.

The arm 62 is equipped with at least one shape sensor 71 at its end supporting the clamp 63.

In this example, the base corresponds to a recharging area 70. As in the previous examples, the rechargeable energy source 72, the first charging antenna 73-1, the electronic processing circuit 74 and the first communication antenna 75-1 are all fixed to the arm 62. Similarly, a second charging antenna 73-2 and a second communication antenna 75-2 are fixed to the recharging area 70. The second charging antenna 73-2 radiates energy from a main energy source (not shown), which may be the mains power supply, in order to recharge the rechargeable energy source 72. The sensor 71 will communicate with a user device 76 for example located in the recharging area 70. The user device 76 may for example control opening and closing of the clamp 64. The recharging area 70 will also comprise a capping 77 that surrounds at least the second charging antenna 73-2 and inside which the arm 6 transits when it moves into the recharging area. It acts as a Faraday cage and prevents energy from leaking into the atmosphere.

The clamp enters the gripping area 67, grips the flask 64 that is at the end of the transport line 65, the sensor 71 detects its shape and transmits the detected information by remote transmission through the electronic processing circuit 74 to the user device 76 that decides what will happen to the flask 64. If it is conform, the arm 62 deposits it in a packaging 68-1 located in the packaging area 68. If it is considered to be defective, the arm 62 puts it in a container 69-1 located in the storage area 69. Continuing its rotary travel, the arm 62 enters into the recharging area 70. The rechargeable energy source 72 can be recharged. As it continues its travel, the arm 62 once again comes into the gripping area 67 and a new flask 64 can be picked up. The sensor thus installed on the arm follows a closed trajectory.

In these different embodiments, the charging and communication antennas are physically different antennas since in these cases described it is useful to be able to transmit energy and information at different frequencies. But it is obvious that these two functions can be performed by a single pair of antennas; all that is necessary is to choose the most suitable frequency for these two modes. For example, the communication antennas at the mobile element 25-1, 60-1, 75-1 could be eliminated and they could be replaced by the charging antennas at the mobile element 23-1, 57-1, 73-1, if the envisaged application does not need to satisfy emission standards, or in order to simplify the device. Similarly, at the base end, the communication antennas 25-2, 60-2, 75-2 could be eliminated and their role could be performed by the charging antennas 23-2, 57-2, 73-2. In this case there would only be two antennas. Or it would be possible to use only three. One of the two communication antennas could be eliminated and its function could be performed by a charging antenna. It would also be possible to do the inverse, and eliminate one of the charging antennas.

Although some embodiments of this invention have been represented and described in detail, it will be understood that various changes and modifications could be made without going outside the scope of the invention.

The invention claimed is:

1. Measurement device comprising:
   at least one measurement sensor designed to be installed on a mobile element free to move with respect to a base, the mobile element being capable of moving into several positions with respect to the base including a proximity position in which the mobile element is close to the base; and
   a power supply device that cooperates with the sensor, the power supply device further comprising a rechargeable energy source equipped with at least one first charging antenna, located at the mobile element and at least one second charging antenna to be coupled to the first charging antenna to recharge the rechargeable energy source, characterized in that the second charging antenna is located at the base and in that the coupling between the at least one first and second charging antennas occurs when the mobile element is in the proximity position.

2. Measurement device according to claim 1, characterized in that the sensor is designed to communicate by remote transmission with a user device in at least one of the several positions other than the proximity position.

3. Measurement device according to claim 1 further comprising at least one first communication antenna located at the mobile element, connected to the sensor and at least one second communication antenna located at the base, connected to a user device and to be coupled to the first communication antenna.

4. Measurement device according to claim 3, characterized in that at least one of the first and second communication antennas and at least one of the first and second charging antennas are coincident.

5. Measurement device according to claim 1 further comprising an electronic processing circuit located close to the sensor on the mobile element, the communication between the sensor and the user device is made through the electronic processing circuit.

6. Measurement device according to claim 1 wherein communication between the sensor and the user device is authorized when the mobile element is in the proximity position with respect to the base.

7. Measurement device according to claim 1, characterized in that the first charging antenna and the second charging antenna are confined in a Faraday cage when the mobile element is in the proximity position with respect to the base.

8. Measurement device according to claim 1, characterized in that the rechargeable energy source comprises at least one accumulator element.

9. Measurement device according to claim 1, characterized in that the rechargeable energy source comprises at least one capacitor.

10. Measurement device according to claim 1, wherein the power supply device further comprises a removable auxiliary charger provided with an auxiliary charging antenna, wherein the auxiliary charging antenna couples to the first charging antenna when the auxiliary charger is proximate to the first charging antenna and the mobile element is in a position other than the proximity position with respect to the base.

11. Measurement device according to claim 10, characterized in that the auxiliary charger is equipped with a shielded box acting as a Faraday cages.

12. Measurement device according to claim 1, characterized in that the mobile element is an aircraft wheel and the base is a hold in which a landing gear equipped with the wheel is stowed, the landing gear being stowed in the hold when in the proximity position.

13. Measurement device according to claim 1, characterized in that the mobile element is an arm and the base is a support for the arm, the arm resting on the support when in the proximity position.

14. Measurement device according to claim 1, characterized in that the sensor on the mobile element follows a closed trajectory, the mobile element moving successively into several positions including at least one working position and the proximity position.

15. Measurement transfer process between at least one measurement sensor supported by a mobile element and a user device in which the sensor is powered with energy by a rechargeable energy source, characterized in that when the mobile element is in a proximity position with respect to a base, wherein the energy source is recharged by coupling between at least two charging antennas, a first charging antenna being located at the mobile element and a second charging antenna located at the base, and in at least one other position, the sensor communicates by remote transmission with the user device through at least two communication antennas, a first communication antenna being located at the mobile element and a second communication antenna being located at the base and being connected to the user device.

16. A system comprising:
   a mobile element having a sensor to measure a desired condition, the mobile element including a rechargeable energy source to power the sensor and a first charging antenna coupled to the rechargeable energy source; and
   a base coupled to the mobile element wherein the base and mobile element are moveable with respect to one another, the base having a power supply and a second charging antenna coupled to the power supply, wherein the second charging antenna is capable of transmitting energy to the first charging antenna to charge the rechargeable energy source when the mobile element is in a desired position.

17. The system according to claim 16 further comprising a user device remote from the mobile element and base and configured to communicate with the sensor regarding the sensed desired condition.

18. The system according to claim 16 wherein the second charging antenna transmits energy to the first charging antenna when both antennas are confined in an enclosure configured to prevent escape of radiation.

19. The system according to claim 16 further comprising an auxiliary charger adapted to be removably coupled to the mobile element, wherein the auxiliary charger provides energy to the first charging antenna to charge the rechargeable energy source.

20. The system according to claim 16, wherein the mobile element further comprises a landing gear of an aircraft and the base is located at the aircraft.

21. The system according to claim 16, wherein the desired position is a proximity position.

* * * * *